US006827532B1

(12) United States Patent
Nix

(10) Patent No.: US 6,827,532 B1
(45) Date of Patent: Dec. 7, 2004

(54) BED RAIL WITH INDICIA-BEARING PANEL FOR PICKUP TRUCKS

(76) Inventor: Edwin Lee Nix, 5464 Brick Church Pike, Goodlettsville, TN (US) 37072

(*) Notice: Subject to any disclaimer, the term of this patent is extended or adjusted under 35 U.S.C. 154(b) by 0 days.

(21) Appl. No.: 10/612,514

(22) Filed: Jul. 2, 2003

Related U.S. Application Data

(60) Provisional application No. 60/394,136, filed on Jul. 5, 2002.

(51) Int. Cl.$^7$ .............................................. B61D 45/00
(52) U.S. Cl. ...................... 410/106; 410/110; 248/499; 296/32
(58) Field of Search ................................ 410/106, 110, 410/115, 116; 296/3, 32, 43; 248/499; 224/309, 325, 326, 567, 568; 24/265 CD, 115 K

(56) References Cited

U.S. PATENT DOCUMENTS

| | | | | |
|---|---|---|---|---|
| 3,623,642 A | * | 11/1971 | Stephen | 224/325 |
| 3,840,250 A | * | 10/1974 | Bott | 403/262 |
| 4,133,465 A | * | 1/1979 | Bott | 224/324 |
| 4,269,339 A | * | 5/1981 | Bott | 224/325 |
| 4,381,123 A | * | 4/1983 | Anderson | 296/43 |
| 4,604,013 A | * | 8/1986 | Elwell et al. | 410/106 |
| 5,364,211 A | * | 11/1994 | Lund | 410/108 |
| 5,476,349 A | * | 12/1995 | Okland | 410/106 |
| 5,752,734 A | * | 5/1998 | Ward et al. | 296/3 |
| 5,827,024 A | * | 10/1998 | Davenport | 410/106 |
| 5,967,719 A | | 10/1999 | Davenport | 410/106 |
| 6,176,658 B1 | * | 1/2001 | Rowe | 410/106 |
| 6,247,881 B1 | * | 6/2001 | Shuen | 410/106 |
| 6,513,849 B2 | * | 2/2003 | Carter | 296/3 |

OTHER PUBLICATIONS

Ford Aftermarket Accessories, part No. 9932230, www.fordvehicles. com/trucks, Ford Motor Company, Dearborn, MI printed Jul. 22, 2003.

F–150 Aftermarket Accessories, part No. 9932230, www.fordvehicles.com/trucks, Ford Motor Company (undated).
Super Duty Aftermarket Accessories, part No. 9932230, www.fordvehicles.com/trucks, Ford Motor Company, Dearborn MI.
Bed Rails, www.driver.com, 2002.
DeeZee Side Rails, www.DeeZee.com, part No. 8100; 92901;99603; DeeZee, Inc. Des Moines, Iowa (undated).
Bedrails, Product 511, Tubular Steel Products, Go Industries, Inc., 420 North Grove, Richardson, TX 75081, www.goindustries.com (undated).
www.truckoutfitters.com/accessories; Truck Outfitters, 3314 N. Roxboro Road, Durham, NC 27704, Kargo Master; Perrycraft; Putco, Bedrails, 2002.
Putco Side Rails, www.putco.com/siderails.shtml, 2002–2003, Not Included. Viewed Online.
Putco Boss Bars, www.putco.com/bossbars.shtml, 2000–2003.
Putco Locker Accessories and Popup Locker, www.putco.com, 2000–2003.

* cited by examiner

*Primary Examiner*—Dennis H. Pedder
*Assistant Examiner*—Paul Chenevert
(74) *Attorney, Agent, or Firm*—Baker, Donelson, Bearman, Caldwell & Berkowitz

(57) ABSTRACT

A bed rail (10) for attaching to a sidewall (12) of a motor vehicle (14), comprising a pair of elongate members (60) held in spaced-apart relation by a leading end cap (16, 30) and a trailing end cap (18, 30), the elongate members defining a space therebetween and an ornamental indicia-bearing panel (20) disposed in the space, for mounting with fasteners to a cap of a sidewall of the motor vehicle. In one aspect, the bed rail assembles by recesses in the elongate members (60) receiving tongues (42, 44) on the end caps (30). A channel (62) in the elongate members hold the edges of the panel. In another aspect, an integral bed rail (90) defines a longitudinal slot (102) through which the panel (20) passes into the space. A method of attaching a bed rail to a sidewall of a motor vehicle is disclosed.

43 Claims, 5 Drawing Sheets

BED RAIL WITH INDICIA-BEARING PANEL FOR PICKUP TRUCKS

The present application is a non-provisional application claiming benefit of co-pending provisional application Ser. No. 60/394,136, filed Jul. 5, 2002.

TECHNICAL FIELD

The present invention relates to bed rails for pickup trucks, and more particularly, the present invention relates to bed rails readily attachable to sidewalls of pickup trucks and further having readily selectively installed indicia-bearing panels for use with pickup trucks.

BACKGROUND OF THE INVENTION

In recent years, trucks have become a large segment of the motor vehicle industry. Pickup trucks having enlarged seating cabs and large cargo beds have likewise increased in popularity. New trucks are costly, and while the manufacturers provide standard and optional equipment, many owners seek to outfit their trucks with accessory products. Indeed, the accessories market for pickup trucks has developed along with the increased acquisition and use of pickup trucks. Truck accessories allow the owner of the truck to personalize and achieve a "look" for the truck with ornamental effects, after-market add-on products, lighting, and sound systems. Notwithstanding, most truck consumers want the accessories to not have "add-on" appearances, but rather, to have a "manufacturers" appearance. Accessories in the pickup truck market now account for a significant majority of sales of automotive accessories sold in the United States.

One popular accessory for pickup trucks is bed rails that mount to the cap or upper edge of the sidewalls that define the bed of the pickup truck. Bed rails are elongate members typically having chrome appearance, although bed rails are also supplied in powder coat or stainless steel. Limited types of bed rails are available. These are notable tube rails and slot rails. Typically, the bed rails have at least one elongate longitudinal opening defined by spaced-apart members or straights and have tapered leading and trailing ends. In addition to ornamental effect, the bed rails further function as tie-down devices, by which loads in the bed of the truck may be secured with cords or connectors attached to the bed rails.

As noted above, many truck owners seek to accessorize their trucks. This includes embellishing the trucks with signage or wording that reflects an appreciation for or an association with a sports team, an educational institution, a scenic outdoors or wildlife image, or a cartoonish commentary, among other graphics or text images.

The bed rails heretofore have not facilitated the combination of bed rail accessory with selective ornamental embellishments.

Accordingly, there is a need in the art for a bed rail readily attachable to sidewalls of pickup trucks and further for selective display and changing of ornamental indicia-bearing panels for use with pickup trucks. It is to such that the present invention is directed.

BRIEF DESCRIPTION OF THE PRESENT INVENTION

The present invention meets the need in the art by providing a bed rail for attaching to a sidewall of a motor vehicle, comprising a pair of elongate members held in spaced-apart relation by a leading end cap and a trailing end cap, the elongate members defining a space therebetween and an ornamental panel disposed in the space, for mounting with fasteners to a cap of a sidewall of motor vehicle.

In another aspect, the present invention provides a bed rail for attaching to a sidewall of a pickup truck, comprising a leading end cap and a trailing end cap, and each has a pair of spaced-apart tongues. An upper elongate member and a lower elongate member each have a recess defined in opposing distal ends for matingly receiving a respective tongue of the leading and the trailing end caps. The leading and trailing end caps, being matingly engaged to the upper and lower elongate members, define an elongate bed rail for attachment to a sidewall of a pickup truck.

In another aspect, the present invention provides a bed rail for attaching to a sidewall of a pickup truck, comprising an elongate member having a leading end and a trailing end with opposing first and second elongate portions extending therebetween and the first elongate portion defining a longitudinal slot. A panel is received through the slot into a gap defined between the first and the second elongate portions. The panel being received through the slot is displayed upon mounting the elongate member to a sidewall of a pickup truck.

In another aspect, the present invention provides a method of installing a bed rail on a sidewall of a motor vehicle, comprising the steps of:

(a) attaching a first elongate member to a cap edge of a sidewall of a motor vehicle, said elongate member defining at least one channel for receiving an ornamental panel therein;

(b) connecting a first end cap to a distal end of the lower elongate member and to the cap edge of the sidewall;

(c) inserting a panel into the channel;

(d) connecting the first end cap to a distal end of a second elongate member while receiving an opposing edge of the panel in a channel therein; and (e) attaching a second end cap to an opposing distal end of the first and the second elongate members and to the cap edge of the sidewall.

Objects, features, and advantages of the present invention will become apparent from a reading of the following detailed description of the invention and claims in view of the appended drawings.

DETAILED DESCRIPTION

Figure 1:
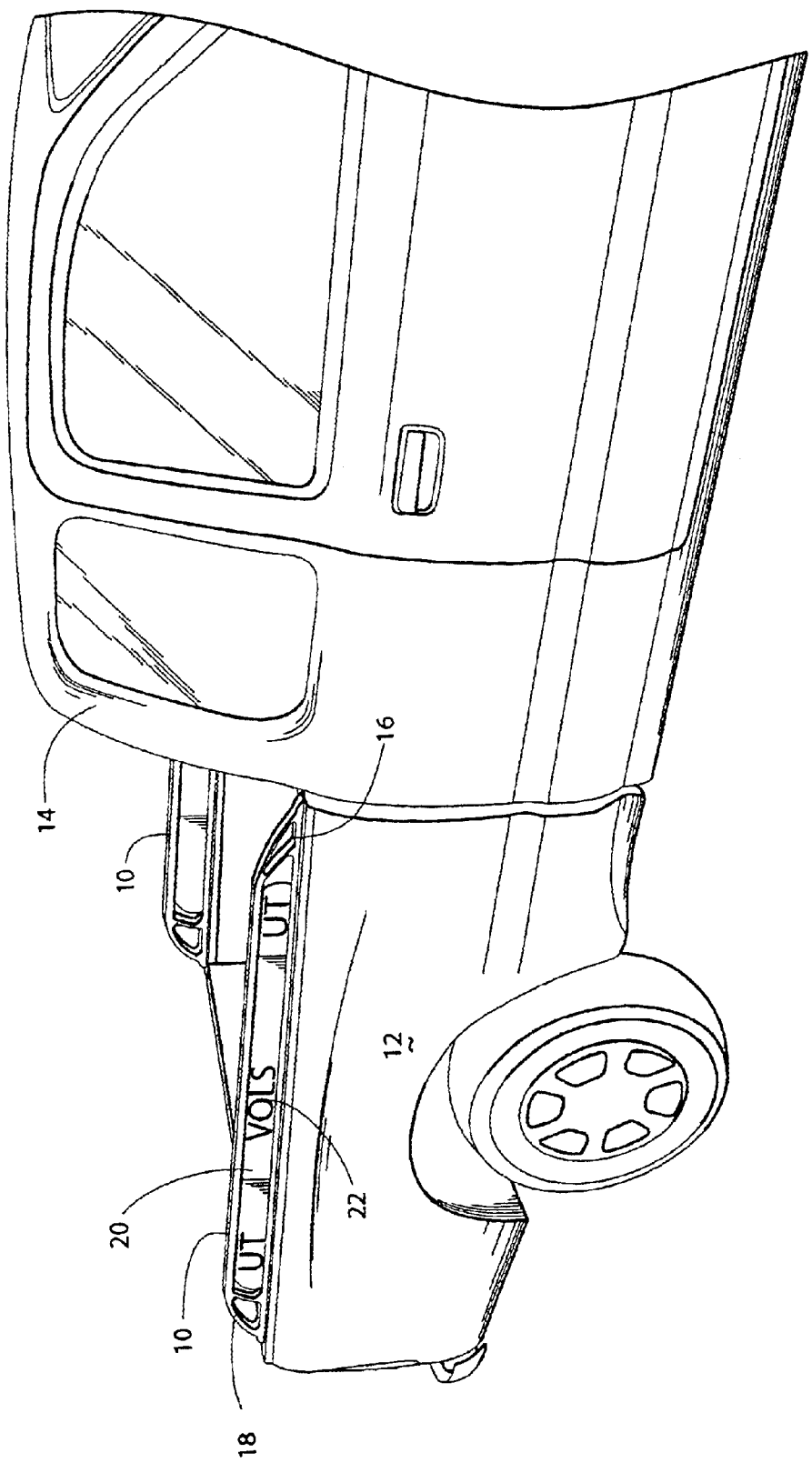
FIG. 1 is a perspective view of a pair of bed rails embodying the present invention attached to sidewalls of a pickup truck.

Referring now in more detail to the drawings, in which like numerals indicate like parts throughout the several views, FIG. 1 illustrates in perspective view a pair of bed rails 10 embodying the present invention attached to sidewalls 12 of a pickup truck 14. The bed rails 10 include a leading end 16 and a trailing end 18. A panel 20 mounts in the bed rails 10. The panel 20 bears indicia 22, such as graphics, symbols, text, or other ornamental effect, as discussed below.

Figure 2:
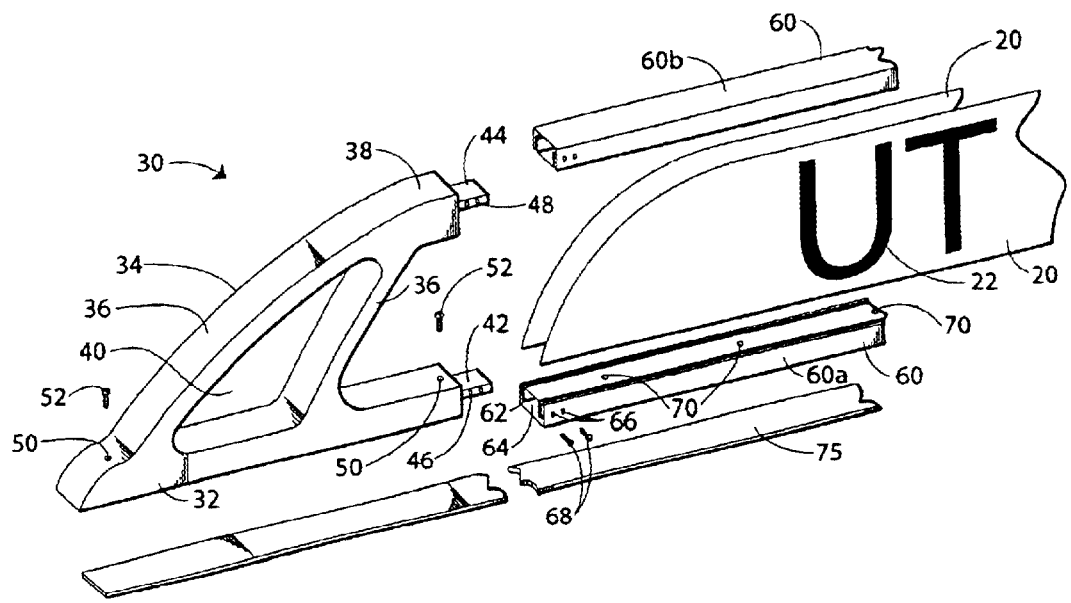
FIG. 2 is an exploded perspective detailed view of the bed rail according to the present invention.

FIG. 2 is an exploded detailed perspective view of the bed rail 10 in a first embodiment of the present invention. The bed rail 10 includes a pair of opposing end caps 30 that define the leading end 16 and the trailing end 18. The end cap 30 includes a foot 32 and a projecting portion 34. In the illustrated embodiment, the projecting portion includes a pair of spaced-apart arcuate arms 36 that join to define an upper distal end 38. The arms 36 define an interior opening 40. A lower tongue 42 projects laterally from the foot 32. An upper tongue 44 projects laterally from the distal end 38. In the illustrated embodiment, the lower tongue 32 and the upper tongue 34 each define a pair of spaced apart openings 46, 48, respectively, that extend through the tongue to the opposing side. The foot 32 defines a pair of recessed openings 50. The recessed openings receive fasteners such as screws 52 for securing the end cap 30 to the sidewall 12 of the pickup truck 14.

The bed rail 10 further includes a pair of elongate members 60 disposed between the leading end 16 and the trailing end 18. In the illustrated embodiment, the member 60 is an extruded tube defining a pair of spaced-apart channels 62 and an intermediate channel 64. The channels 62, 64 extend longitudinally. In the illustrated embodiment, opposing sidewalls of the elongate member 60 define openings 66 at distal end portions. The openings 66 align with the openings 46, 48 in the tongues 42, 44. The openings 66 and 46, 48 receive fasteners such as a screw 68 for securing the elongate member 60 to the end cap 30, as discussed below. The elongate member 60 further defines a plurality of spaced-apart openings 70 which receive fasteners for securing the elongate member 60 to the sidewall 12 of the pickup truck 14.

Figure 5:
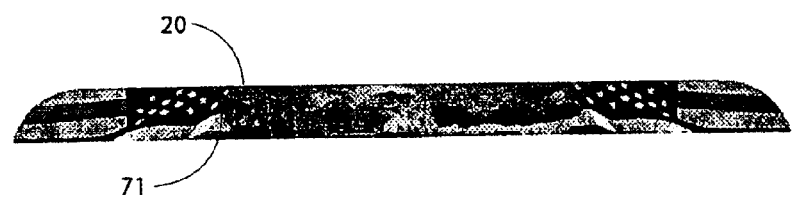
FIG. 5 is a front elevational view of a panel having a graphic image for use with the bed rail illustrated in FIG. 1.
Figure 6:
FIG. 6 is a front elevational view of a panel having base relief for use with the bed rail illustrated in FIG. 1.

The panels 20 seat in the channels 62. The panels 20 may include indicia 22, such as symbols, words, text or other graphic images. The panels 20 may be painted, colored, or otherwise ornamentally decorated. For example, FIG. 5 is a plan view of the panel 20 having a graphic image 71 for use with the bed rail 10. The panels 20 may be made of a sheet material, including a translucent material containing a tinting or coloring, a metal plate, wood, plastic, or other suitable image-bearing sheet. In addition, the panel 20 may be a molded member having an embossed graphic or a three-dimensional surface illustrating a graphic image, design or other textured surface treatment. FIG. 6 illustrates in plan view the panel 20 having a base relief image 73 for use with the bed rail 10.

Figure 3:
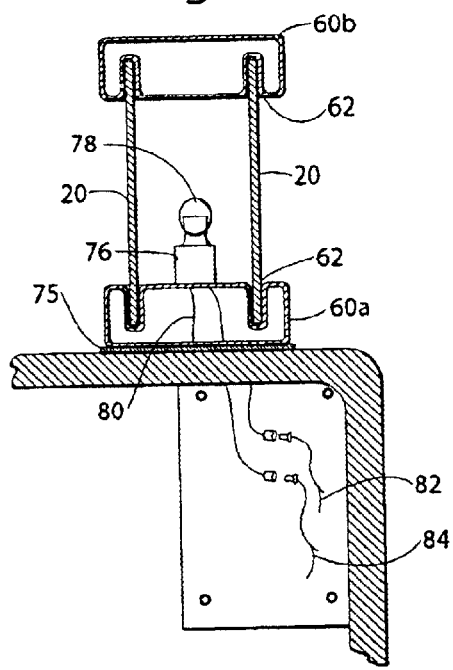
FIG. 3 is an end view of the bed rail according to the present invention attached to a sidewall of a pickup truck.

FIG. 3 is an end view of the bed rail 10 attached to the sidewall 12 of the pickup truck. The elongate members 60 are oriented in opposing relation with the channels 62 aligned and facing the channels in the opposing elongate member. A lower one 60a of the elongate members 60 connects with fasteners through the openings 70 to the sidewall 12. A pad or cushion strip 75 sits between the sidewall 12 and the lower elongate member 60a. An upper one 60b of the elongate members 60 is held in place by being disposed between and attached to the end caps 30 at the leading end 16 and the trailing end 18, as discussed below. The opposing edges of the panels 20 seat in the aligned channels 62.

A light fixture 76 mounts to the lower elongate member 60. The light fixture 76 includes a lamp 78 which connects through wires 80 to a source of electrical current, such as leads 82 extending from the rear light housing 84 for the parking and driving lights of the pickup truck. The light fixture 76 in the illustrated embodiment is designed for 12 volt direct current that is conventional with motor vehicles. A suitable light fixture 76 is the 140 SERIES INDIRECT STRIP FLORESCENT lighting fixture available from Thin-Lite Corporation of Camarillo, Calif.

Figure 4:
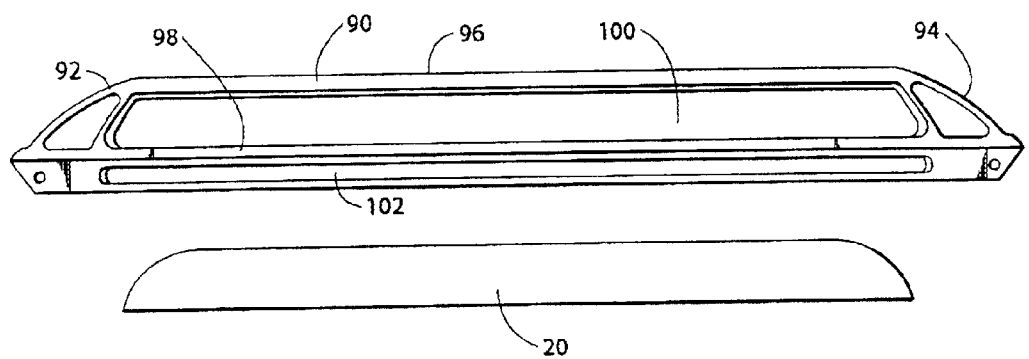
FIG. 4 is a bottom perspective view of a bed rail embodying principles of the present invention with an ornamental panel exploded therefrom.

FIG. 4 is a bottom perspective view of an alternate embodiment of a bed rail 90 embodying principles of the present invention. The bed rail 90 comprises an integral body having opposing distal ends 92, 94 connected by upper and lower elongate members 96, 98. The spaced-apart members 96,98 define an open area 100. The member 98 defines a footer for seating on the sidewall 12 of the pickup truck. The footer 98 further defines a slot 102 extending longitudinally. The panel 20 slides through the slot 102 into the open area 100.

With reference to FIGS. 1 and 2, the bed rail 10 readily assembles for attaching to the sidewall 12 of the pickup truck 14. This is accomplished by positioning the strip 75 on the cap or upper portion of the sidewall 12. The lower elongate member 60a sits on the strip 75. Screws pass through the openings 70 to affix the lower elongate member 60a to the sidewall 12. The strip 75 functions to protect the vehicle finish, cushion the seating of the lower elongate member, and seal from water leakage between the lower elongate member and the sidewall 12. The cap of some pickup truck sidewalls may be curved. For such, the strip 75 is taperingly thicker or wedge-shaped from one edge to the opposing edge, so that the bed rail seats level.

The end cap 30 for the leading end 16 is then attached. The intermediate channel 64 in the elongate member 60 defines a recess which receives the tongue 42 extending from the foot 32. The screws 52 pass through the countersunk openings 50 to secure the end cap 30 to the sidewall 12 at the leading end 16 of the bed rail 10.

With reference to FIG. 3, the bed rail 10 may use the light fixture 76. The light fixture 76 is installed by attaching to the elongate member 60. This is accomplished with fasteners such as screws, rivets, or other fastening devices. The wires 80 extend through an opening defined in the elongate member 60 and through an opening in the sidewall 12. The wires 80 connect to the leads 82 extending from the rear light housing 84 containing the parking or driving lights. The rear light housing provides access to electrical current upon activation of the conventional vehicle lighting system, such as head lights for night driving.

The panels 20 then seat in the channels 62 of the lower elongate member 60a.

The upper elongate member 60b is then installed. The upper edges of the panels 20 seat in the channels 62 of the upper elongate member 60b. The intermediate channel 64 receives the tongue 44 of the end cap 30 attached at the leading end 16. The upper elongate member 60b is moved laterally to engage the tongue 44 in the intermediate channel 64. As an alternate assembly method, the panels 20 are not inserted until after the upper elongate member 60b is attached to the tongue 44. Then, the panels 20 slide in the aligned channels 62 of the elongate members 60. While both the elongate members 60 may be from the same extrusion, the upper elongate member 60b may be bent to provide an arcuate ornamental appearance to the rail.

It is to be appreciated that in the embodiment using the light fixture 76, the panel 20a inwardly of the bed rail 10 may include an interior reflector surface, such as a metallic film or other reflective material.

Finally, the end cap 30 for the opposing end 18 is installed. The tongues 42, 44 slidingly enter the respective recesses defined by the intermediate channels 64 in the elongate members 60. Screws 52 extend through the openings 50 in the end cap 30 to connect the end cap 30 to the sidewall 12 at the trailing end 18. While the end cap 30 used for the trailing end 18 may be the same as that used for the leading end 16, the ornamental aerodynamic appearance of the bed rail 10 may be enhanced by using an end cap 30 for the trailing end having a sloping gradient shallower than that in the end cap used for the leading end. The end caps 30 as well as the elongate members 60 are readily manufactured as extrusions, such as with aluminum, plastic or other extrudable material, but may be cast, molded, or machined as well. The elongate members 60 extend substantially the length of the sidewall 12.

In the illustrated embodiment, screws 68 pass through the holes 66 and into the holes 46, 48 on opposing sides to secure the elongate members 60 to the end caps 30. However, an alternate embodiment does not use these fasteners and holes. Rather, the extended tongues 42, 44 slip-fit into the recesses defined by the intermediate channels 64. Fastening the lower elongate member 60a and fastening the end caps 30 to the bed rail also holds the upper elongate member 60b in position.

An alternate embodiment provides a single channel 62 in the elongate members, with an adjacent channel for receiving the tongues 42, 44. In another alternate embodiment the elongate member defines a single channel that combines the panel-receiving function of the channel 62 with the connecting function of the intermediate channel 64, whereby the tongues 42, 44 are received in a recess defined by the distal end portion of the channel while the remainder of the channel receives the edge of the panel. In another alternate embodiment, the tongues 42, 44 comprise discrete detachable connectors. The end cap 30 defines side recesses which receive the tongues for connecting the end cap to the elongate member.

The present invention provides for readily changing the panel 20. This is accomplished by removing the fastening screws 52 from the end cap 30 at the trailing end 18 of the bed rail 10. The panels 20 slide longitudinally in the channels 62 outwardly of the open end of the bed rail 10. The replacement panels 20 are inserted slidingly along the channels 62. The end cap 30 is reinstalled on the trailing end 18.

While the illustrated embodiment shows the openings 66 in the distal end portions of the elongate members 60 and the passages 46, 48 in the tongues 42, 44, it is to be appreciated that the bed rail 10 may be assembled without such. In this alternate embodiment, the securing of the lower elongate member 60a and the end caps 30 to the sidewall 12 is sufficient to lock the upper elongate member 60b in position between the end caps 30 of the leading and trailing ends 16, 18.

With reference to FIG. 4, the bed rail of the present invention may be an integral body such as the bed rail 90. This embodiment is injection molded or cast. The bed rail 90 receives the panel 20 through the slot 102 into the opening 100 prior to installation of the bed rail 90 on to the sidewall 12 of the pickup truck. Fasteners pass through openings defined in the footer of the bed rail 90 to secure the bed rail to the sidewall 12. It is to be appreciated that the bed rail of the present invention may likewise be used for signage or wording for roof racks on motor vehicles.

Figure 7A:
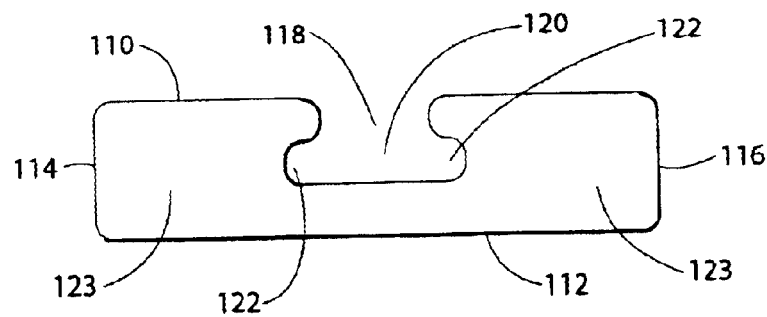
FIG. 7A is an end view showing a profile of an alternate embodiment of the elongate member that defines the bed rail of the present invention.
Figure 7B:
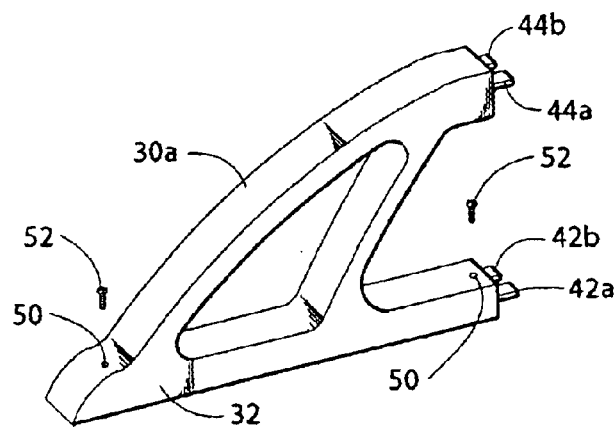
FIG. 7B is a perspective view of an alternate embodiment of the end cap useful with the elongate member illustrated in FIG. 7A.

FIG. 7A is an end view showing a profile of an alternate embodiment elongate member 110 used to make a bed rail according to the present invention. The elongate member 110 includes a base 112 with opposing sides 114, 116 in a substantially rectangular profile. It is to be appreciated that other profiles may be gainfully used with the elongate member in the practice of the present invention. The elongate member 110 defines in this embodiment an inverted T-channel 118 having a main channel 120 and laterally extended opposing slots 122. The T-channel 118 defines opposing recesses 123 (distal end portions of the tubular space lateral of the longitudinally extending T-channel.) In one embodiment of the end cap 30 the tongues 42, 44 matingly conform to the shape of the T-channel 118, for connecting the end caps 30 to the pair of the elongate members 110 to assemble the bed rail. However, a pair of tongues 42a, 42b and 44a, 44b are used in the embodiment of the end cap 30 end cap 30a illustrated in FIG. 7B. The recesses 123 in the elongate member 110 receive the tongues 42a, 42b and 44a, 44b when connecting the end caps 30a to the elongate member 110. While embodiment illustrated in FIG. 7A has a single channel, a plurality of channels may be included, such as two spaced-apart channels that each receive a panel 20 for enclosing light fixtures 76 discussed above.

Figure 8A:
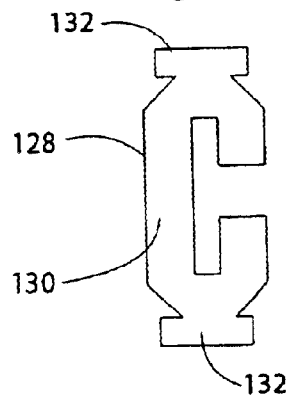
FIG. 8A is a plan view of a letter used with the elongate member illustrated in FIG. 7A.

The elongate member 110 readily receives a plurality of individual graphic devices rather than the panel 20. FIG. 8A is a plan view of a letter device 128 used with the elongate member 110. The letter device 128 includes a letter portion 130 with opposing tabs 132 that stabilize the letter device 128 in the channels 118 (or channel 62 in the embodiment illustrated in FIG. 2.) Although not illustrated, the tabs 132 may include laterally extending flanges that are received in the slots 122 of the channel 118. A plurality of letters may be arranged to spell a word or message for display.

Figure 8B:
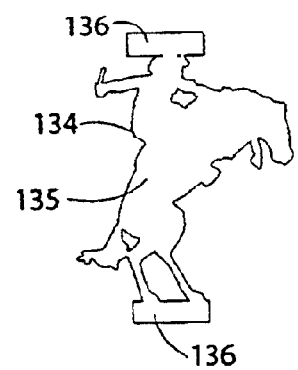
FIG. 8B is a plan view of a graphic device used with the elongate member illustrated in FIG. 7A.

FIG. 8B is a plan view of a graphic device 134 used with the elongate member 110. The graphic device 134 includes a graphic element 135 and opposing tabs 136 that stabilize the graphic device 134 in the channels 118 of opposing elongate members 110. Similarly to the tabs 132, the tabs 136 may include lateral flanges for being received in the slots 122. Other ornamental graphic elements may be used in the graphic device 134.

Figure 9:
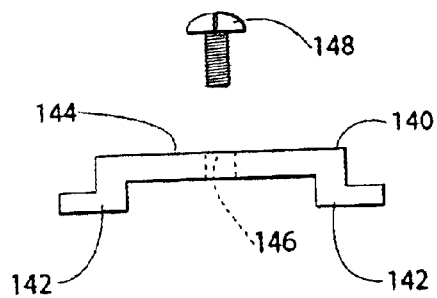
FIG. 9 is an end view of a containment stop for securing letters and graphic devices of a type shown in FIGS. 8A and 8B.

The elongate members 110 receive a plurality of the letter devices 128 and graphic devices 134. FIG. 9 is an end view of a containment stop 140 for securing the letter devices and graphic devices in the channels 118. The containment stop 140 defines an inverted U-shape with lateral flanges 142 extending from a bridge 144. The bridge 144 defines a threaded bore 146 that receives a set screw 148. The slots 122 of the channel 118 receive the flanges 142. The set screw 148 bears against an interior surface of the channel 118 to lock the containment stop 140 in place and thereby secure the letter devices 128 and the graphic devices 134 in the elongate member 110.

Figure 10:
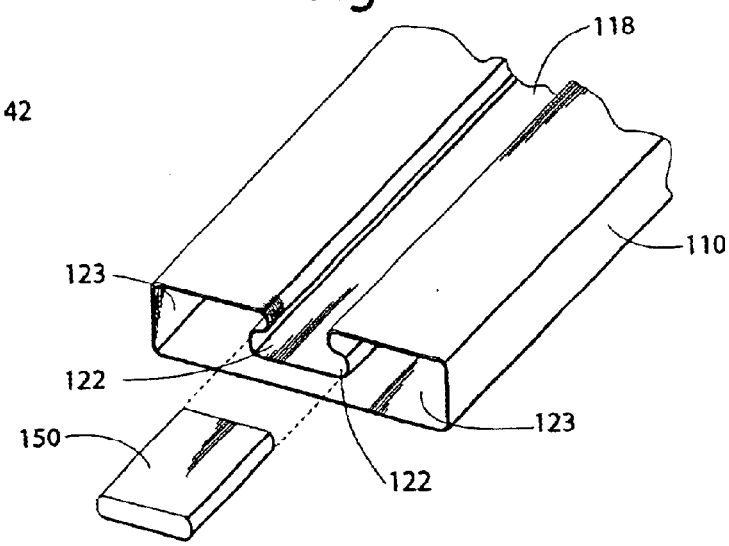
FIG. 10 is a perspective exploded view of the elongate member illustrated in FIG. 7A with a spacer to separate letters and graphic devices.

FIG. 10 is a perspective view of the elongate member 110 with a spacer 150 shown apart from the channel 118 in which the spacer is received. The slots 122 slidingly receive the edges of the spacer 150. The spacer 150 is an elongate bar of a selected length to separate the letter devices 128 and the graphic devices 134 in the elongate member 110. The spacer 150 may be made of metal, plastic, rubber, or other suitable material.

Figure 11:
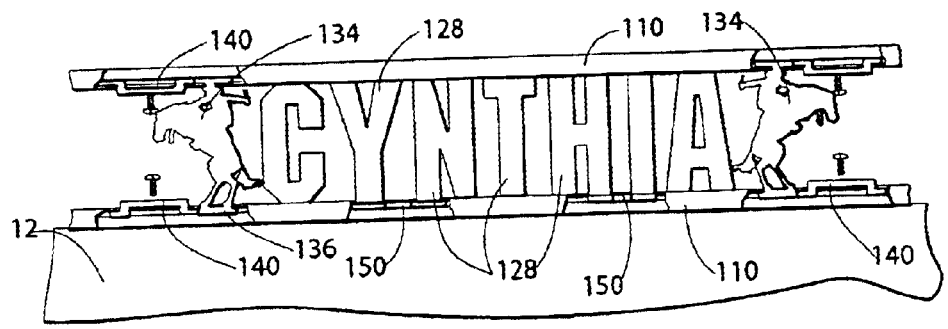
FIG. 11 is a side view of a portion of a bed rail using the elongate members shown in FIG. 7A with letters and graphic devices shown in FIGS. 8A and 8B.

FIG. 11 is a side view of a portion of a bed rail using a pair of the elongate members 110 disposed with the channels 118 in facing relation. Selected letter devices 128 and graphic devices 134 are disposed in a sequence in the channels. Spacers 150 separate the letter devices and graphic devices and the containment stops 140 on opposing ends of the sequence secure the letter devices and graphic devices from movement along the channels 118, as shown in cut-away view.

With reference to FIG. 11, the elongate member 110 selectively receives one or more of the letter devices 128 and/or the graphic devices 134 in a sequence, to display a message with the graphic devices 134 as bookends. The letter devices 128 and graphic devices 134 are spaced-apart by the spacers 150. The containment stops 140 positioned at opposing ends of the sequence secure the letter devices and the graphic devices. The lower elongate member 110 is secured to the cap of the sidewall 12. The leading end cap 16 is positioned with the tongues 42, 44 received in the recess 123. The leading end cap 16 is fixed with fasteners to the sidewall. The opposing elongate member 110 is positioned with the tabs 132, 136 of the letter devices and graphic devices slidingly received in the channel 118, separated by appropriate spacers 150 and the containment stops 140. The trailing end cap 18 is installed, with the tongues 42, 44 received in the recesses 123 in the opposing distal end of the elongate member 110. The trailing end cap 18 is fastened to the sidewall 12. Alternatively, the pair of opposing elongate members 110 may be assembled with the sequence of the letter devices 128, the graphic devices 134, spacers 150, and the containment stops 140. The assembly is then attached to the sidewall 12 with fasteners through the lower one of the elongate members 110. The leading and trailing end caps are then attached to the distal ends of the elongate members 110 and to the side wall 12.

While this invention has been described in detail with particular references to the preferred embodiments thereof, it should be understood that many modifications, additions and deletions, in addition to those expressly recited, may be made thereto without departure from the spirit and scope of the invention.

What is claimed is:

1. A bed rail for attaching to a sidewall of a pickup truck, comprising:

a leading end cap and a trailing end cap, each having a pair of spaced-apart tongues;

an upper elongate member and a lower elongate member, each member having a recess defined in opposing distal ends for matingly receiving a respective tongue of the leading and trailing end caps; and means for supporting an ornamental panel between the upper and the lower elongate members, whereby the leading and trailing end caps, being matingly engaged to the upper and lower elongate members, define an elongate bed rail for attachment to a sidewall of a pickup truck.

2. The bed rail as recited in claim 1, wherein the leading end cap and the trailing end cap each include a foot that defines at least one opening for receiving a fastener for securing the respective end caps to the sidewall.

3. The bed rail as recited in claim 1, wherein the lower elongate member defines at least two spaced-apart openings for receiving fasteners for securing the lower elongate member to the sidewall.

4. The bed rail as recited in claim 1, wherein the tongues each define bores; and wherein the upper and the lower elongate members define openings in respective distal end portions which openings align with the bores; and further comprising fasteners extending through the aligned openings and bores for securing the end caps to the elongate members.

5. The bed rail as recited in claim 1, wherein means for supporting comprises the upper and the lower elongate member each defining at least one longitudinally extending channel, the opposing channels aligned for receiving opposing edge portions of the ornamental panel therein.

6. The bed rail as recited in claim 1, wherein means for supporting comprises the lower elongate member defining a longitudinally extending slot for receiving the ornamental panel therethrough.

7. The bed rail as recited in claim 1, further comprising means for illuminating the ornamental panel.

8. The bed rail as recited in claim 7, wherein means for illuminating comprises a light fixture attached to the bed rail and having electrical wires for communicating a supply of electrical current from a source to the light fixture.

9. The bed rail as recited in claim 1, wherein means for supporting comprises the upper and the lower elongate member each defining a pair of spaced-apart longitudinally extending channels, the respective channels in the opposing elongate members aligned for receiving respective edges of an ornamental panel therein.

10. The bed rail as recited in claim 9, further comprising means for illuminating the ornamental panels.

11. The bed rail as recited in claim 10, wherein means for illuminating comprises a light fixture attached to the lower elongate member intermediate the opposing ornamental panels and having electrical wires for communicating a supply of electrical current from a source to the light fixture.

12. A bed rail for attaching to a sidewall of a pickup truck, comprising:

a leading end cap and a trailing end cap, each having a pair of spaced-apart tongues;

an upper elongate member and a lower elongate member, each upper and lower elongate member having a recess defined in opposing distal ends for matingly receiving a respective tongue of the leading and trailing end caps and each upper and lower elongate member defining a pair of spaced-apart longitudinally extending channels; and a pair of panels received in respective aligned channels of the upper and lower elongate members, whereby the panels received in the channels are held therein by the leading and trailing end caps being matingly engaged to the upper and lower elongate members, for attachment to a sidewall of a pickup truck.

13. The bed rail as recited in claim 12, wherein the leading and trailing end caps each include a foot that defines at least one opening for receiving a fastener to secure the respective end caps to the sidewall.

14. The bed rail as recited in claim 12, wherein the lower elongate member defines at least two spaced-apart openings for receiving fasteners to secure the lower elongate member to the sidewall.

15. The bed rail as recited in claim 12, wherein the tongues each define bores; and
    wherein the upper and the lower elongate members define openings in respective distal end portions which openings align with the bores; and
    further comprising fasteners extending through the aligned openings and bores for securing the end caps to the elongate members.

16. The bed rail as recited in claim 12, further comprising means for illuminating the ornamental panel.

17. The bed rail as recited in claim 16, wherein means for illuminating comprises a light fixture attached to the lower elongate member intermediate the opposing ornamental panels and having electrical wires for communicating a supply of electrical current from a source to the light fixture.

18. A bed rail for attaching to a sidewall of a pickup truck, comprising:
    a leading end cap and a trailing end cap, each having a pair of spaced-apart tongues;
    an upper elongate member and a lower elongate member, each upper and lower elongate member having a recess defined in opposing distal ends for matingly receiving a respective tongue of the leading and trailing end caps and the lower elongate member defining a longitudinally extending slot therein; and
    a panel received through the slot into a gap between the upper and the lower elongate members,
    whereby the panel being received by the lower elongate member is displayed upon mounting the bed rail to a sidewall of a pickup truck.

19. The bed rail as recited in claim 18, wherein the leading and trailing end caps each include a foot that defines at least one opening for receiving a fastener to secure the respective end caps to the sidewall.

20. The bed rail as recited in claim 18, wherein the lower elongate member defines at least two spaced-apart openings for receiving fasteners to secure the lower elongate member to the sidewall.

21. The bed rail as recited in claim 18, wherein the tongues each define bores; and
    wherein the upper and the lower elongate members define openings in respective distal end portions which openings align with the bores; and
    further comprising fasteners extending through the aligned openings and bores for securing the end caps to the elongate members.

22. The bed rail as recited in claim 18, further comprising means for illuminating the panel.

23. The bed rail as recited in claim 22, wherein means for illuminating comprises a light fixture attached to the bed rail and having electrical wires for communicating a supply of electrical current from a source to the light fixture.

24. A bed rail for attaching to a sidewall of a pickup truck, comprising:
    an elongate member having a leading end and a trailing end with opposing first and second elongate portions extending therebetween with the first elongate portion defining a longitudinal slot; and
    a panel received through the slot into a gap defined between the first and the second elongate portions,
    whereby the panel being received through the slot is displayed upon mounting the elongate member to a sidewall of a pickup truck.

25. The bed rail as recited in claim 24, wherein the leading and trailing ends each include a foot portion that defines at least one opening for receiving a fastener to secure the elongate member to the sidewall.

26. The bed rail as recited in claim 24, further comprising means for illuminating the ornamental panel.

27. The bed rail as recited in claim 26, wherein means for illuminating comprises a light fixture attached to the elongate member and having electrical wires for communicating a supply of electrical current from a source to the light fixture.

28. A method of installing a bed rail on a sidewall of a motor vehicle, comprising the steps of:
    (a) attaching a first elongate member to a cap edge of a sidewall of a motor vehicle, said elongate member defining at least one channel for receiving an ornamental panel therein;
    (b) connecting a first end cap to a distal end of the lower elongate member and to the cap edge of the sidewall;
    (c) inserting a panel into the channel;
    (d) connecting the first end cap to a distal end of a second elongate member while receiving an opposing edge of the panel in a channel therein; and
    (e) attaching a second end cap to an opposing distal end of the first and the second elongate members and to the cap edge of the sidewall.

29. The method as recited in claim 28, wherein step (b) comprises inserting a tongue extending from the first end cap into a recess defined in elongate member.

30. The method as recited in claim 29, wherein the recess comprises a distal end portion of the channel.

31. A bed rail for attaching to a sidewall of a motor vehicle, comprising a pair of elongate members held in spaced-apart relation by a leading end cap and a trailing end cap, the elongate members defining a space therebetween and an ornamental panel disposed in the space, for mounting with fasteners to a cap of a sidewall of a motor vehicle.

32. The bed rail as recited in claim 31, wherein the leading end cap and the trailing end cap each include a foot that defines at least one opening for receiving a fastener to secure the respective end caps to the sidewall.

33. The bed rail as recited in claim 31, wherein one of the elongate members defines at least two spaced-apart openings for receiving fasteners to secure the one elongate member to the sidewall.

34. The bed rail as recited in claim 31, wherein the elongate members each define at least one longitudinally extending channel for receiving an edge portion of the ornamental panel.

35. The bed rail as recited in claim 31, further comprising means for illuminating the ornamental panel.

36. The bed rail as recited in claim 35, wherein means for illuminating comprises a light fixture attached to the bed rail and having electrical wires for communicating electrical current from a source to the light fixture.

37. The bed rail as recited on claim 31, wherein the bed rail defines an opening to the space for receiving the panel therein.

38. The bed rail as recited in claim 37, wherein the opening comprises one of the elongate members defining a longitudinal slot open to the space.

39. The bed rail as recited in claim 38, wherein the bed rail is integral.

40. The bed rail as recited in claim 37, wherein the opening comprises selectively detaching one of the leading and trailing end caps, whereby the panel slidingly passes therethrough into the space.

41. The bed rail as recited in claim 40, wherein the elongate member defines a longitudinal slot for receiving the panel.

42. The bed rail as recited in claim 41, wherein the leading end cap and the trailing end cap define tongues; and wherein the elongate members define recesses at opposing distal ends configured for matingly receiving the tongues for securing the end caps to the elongate members.

43. The bed rail as recited in claim 42, wherein the tongues each define bores; and wherein the elongate members define openings in respective distal end portions which openings align with the bores; and further comprising fasteners extending through the aligned openings and bores for securing the end caps to the elongate members.

* * * * *